United States Patent
Hazeghi et al.

(10) Patent No.: US 9,503,708 B2
(45) Date of Patent: Nov. 22, 2016

(54) SYSTEMS AND METHODS FOR REDUCING Z-THICKNESS AND ZERO-ORDER EFFECTS IN DEPTH CAMERAS

(71) Applicant: Aquifi, Inc., Palo Alto, CA (US)

(72) Inventors: Aryan Hazeghi, Palo Alto, CA (US); Giulio Marin, Sunnyvale, CA (US); Francesco Peruch, Sunnyvale, CA (US); Carlo Dal Mutto, Sunnyvale, CA (US); Abbas Rafii, Palo Alto, CA (US)

(73) Assignee: Aquifi, Inc., Palo Alto, CA (US)

( * ) Notice: Subject to any disclaimer, the term of this patent is extended or adjusted under 35 U.S.C. 154(b) by 0 days.

(21) Appl. No.: 14/743,738

(22) Filed: Jun. 18, 2015

(65) Prior Publication Data

US 2016/0127714 A1 May 5, 2016

Related U.S. Application Data

(60) Provisional application No. 62/074,592, filed on Nov. 3, 2014, provisional application No. 62/133,252, filed on Mar. 13, 2015.

(51) Int. Cl.
| | |
|---|---|
| *G02B 27/42* | (2006.01) |
| *H04N 13/02* | (2006.01) |
| *G06K 9/20* | (2006.01) |
| *G06T 7/00* | (2006.01) |
| *G02B 27/00* | (2006.01) |
| *G02B 27/30* | (2006.01) |
| *G03B 17/54* | (2006.01) |

(52) U.S. Cl.
CPC ...... *H04N 13/0271* (2013.01); *G02B 27/0075* (2013.01); *G02B 27/30* (2013.01); *G02B 27/42* (2013.01); *G02B 27/4205* (2013.01); *G06K 9/2036* (2013.01); *G06T 7/0057* (2013.01); *G03B 17/54* (2013.01); *G06K 2209/40* (2013.01); *G06T 2207/10028* (2013.01); *G06T 2207/10152* (2013.01); *G06T 2207/20228* (2013.01)

(58) Field of Classification Search
CPC .......... G02B 3/08; G02B 5/008; G02B 5/02; G02B 5/18; G02B 27/09; G02B 27/42; G03B 6/35
See application file for complete search history.

(56) References Cited

U.S. PATENT DOCUMENTS

| | | | |
|---|---|---|---|
| 7,970,177 B2 | 6/2011 | St. Hilaire et al. | |
| 8,630,039 B2 | 1/2014 | Shpunt | |
| 8,749,796 B2 | 6/2014 | Pesach et al. | |
| 8,995,057 B2 | 3/2015 | Miyasaka et al. | |
| 2002/0071472 A1 | 6/2002 | Dickson et al. | |
| 2002/0196415 A1 | 12/2002 | Shiratani | |
| 2009/0185274 A1 | 7/2009 | Shpunt | |
| 2010/0284082 A1* | 11/2010 | Shpunt ................... | G01B 11/25 359/558 |
| 2013/0294468 A1 | 11/2013 | Sridharan et al. | |
| 2015/0234291 A1 | 8/2015 | Patra et al. | |

\* cited by examiner

*Primary Examiner* — Sultan Chowdhury
*Assistant Examiner* — Danell L Owens
(74) *Attorney, Agent, or Firm* — Lewis Roca Rothgerber Christie LLP

(57) ABSTRACT

A projection system configured to emit patterned light along a projection optical axis includes: a diffractive optical element configured to perform a collimation function on the light emitted by the light emitter and to perform a pattern generation function to replicate the collimated light in a pattern, the pattern having substantially no collimated zero-order; and a light emitter configured to emit light toward the diffractive optical element, wherein the collimation function is configured to collimate the light emitted from the light emitter, and wherein the pattern generation function is configured to replicate the collimated light to produce the patterned light.

22 Claims, 8 Drawing Sheets

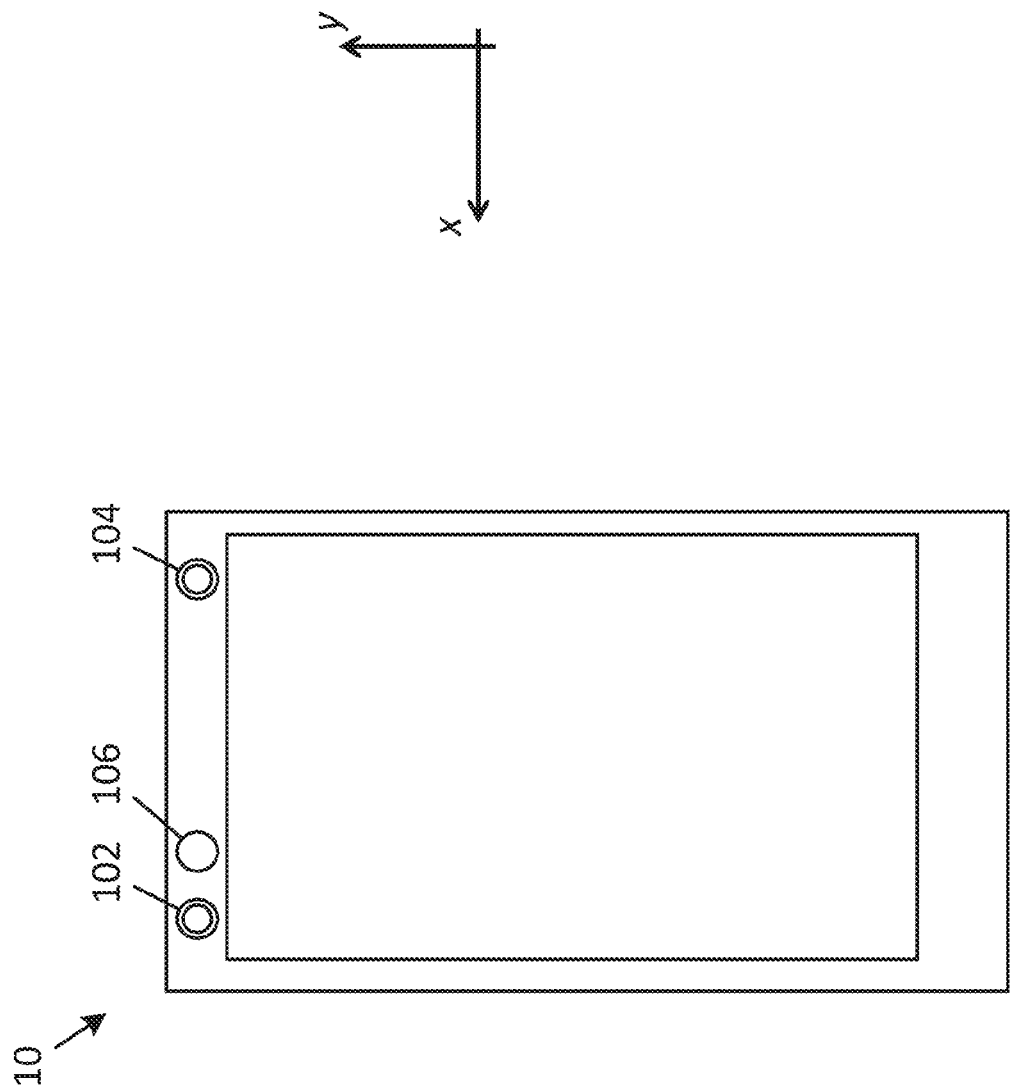

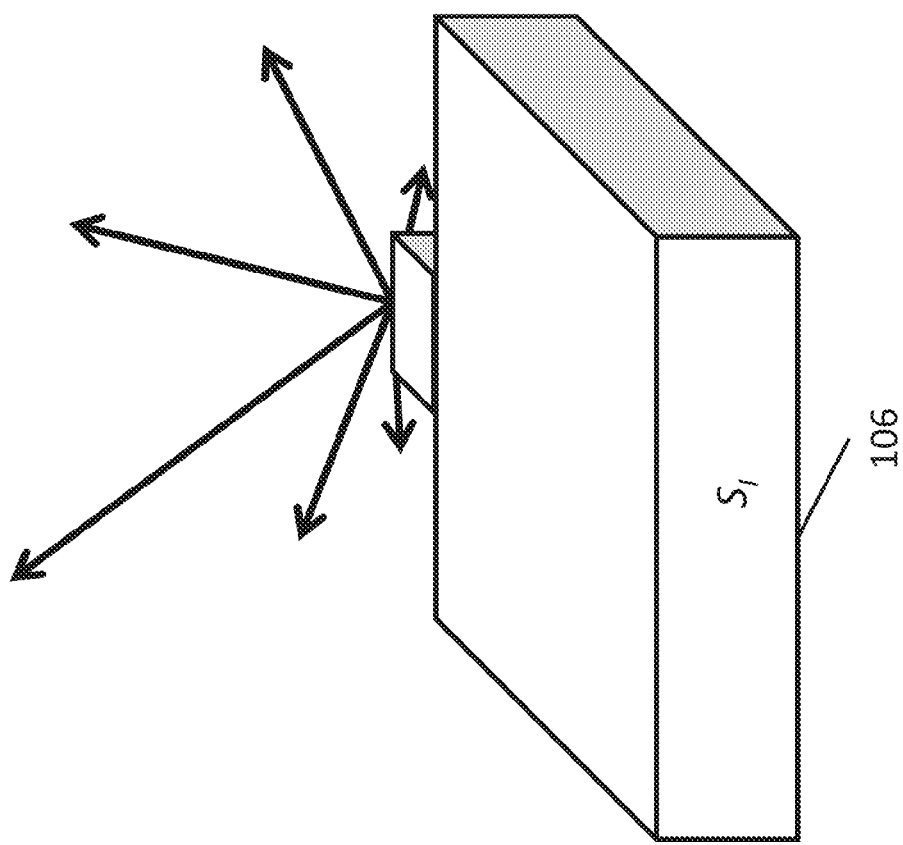
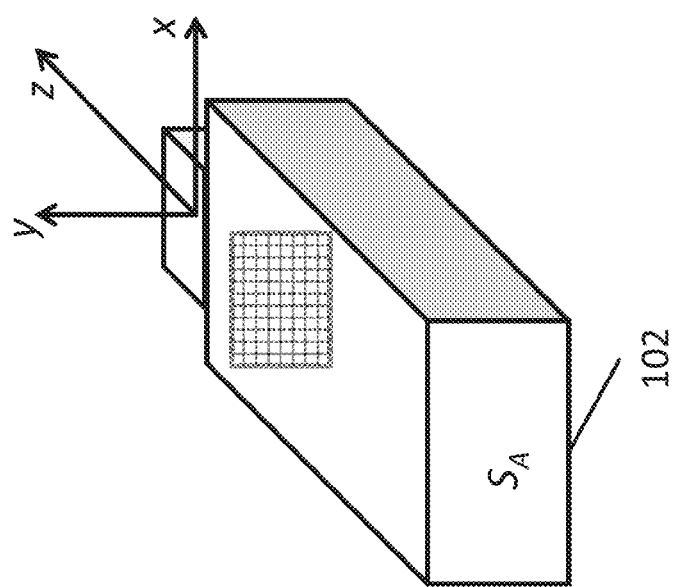
FIG. 3B

SYSTEMS AND METHODS FOR REDUCING Z-THICKNESS AND ZERO-ORDER EFFECTS IN DEPTH CAMERAS

CROSS-REFERENCE TO RELATED APPLICATION(S)

This application claims the benefit of U.S. Provisional Patent Application No. 62/074,592, titled " Systems and Methods for Reducing Z-Thickness and Zero-Order Effects in Consumer Depth Cameras,"filed in the United States Patent and Trademark Office on Nov. 3, 2014, the entire disclosure of which is incorporated herein by reference and U.S. Provisional Patent Application No. 62/133,252, titled "An Ultrathin 3D Depth Sensor and Projection System" filed in the U.S. Patent and Trademark Office on Mar. 13, 2015, the entire disclosure of which is incorporated herein by reference.

This application is related to "3D Depth Sensor and Projection System and Methods of Operating Thereof," application Ser. No. 14/743,742, filed in the United States Patent and Trademark Office on even date herewith, the entire disclosure of which is incorporated herein by reference.

BACKGROUND

Depth camera systems capture a scene and estimate the depth (or "z-distance") of each pixel in a scene, thereby generating a "depth map," an example of which is shown in FIG. 1. Generally depth camera systems (or more simply "depth cameras") can be classified into passive depth cameras and active type depth cameras.

Active type depth cameras generally include an illumination component which emits light onto a scene. Broadly, these include "time-of-flight" active depth cameras, which emit diffuse modulated illumination onto the scene and "structured light" active depth cameras, which emit a collimated illumination pattern.

Generally, an active depth camera includes an active illumination component $S_I$, an image acquisition component $S_A$, and a processing component $S_P$, where the processing component implements a depth estimation algorithm. The illumination system $S_I$ illuminates the scene with diffuse or collimated light, which can be constant over time, pulsed, or modulated. The illumination may be concentrated in a single wavelength or span a range of wavelengths.

Some active illumination components $S_I$ use a light emitter such as a laser and one or more optical elements to generate a collimated beam having a pattern. Commonly, one or more diffractive optical elements are used to replicate an incident collimated beam over a collection of collimated beams which comprise the illumination pattern. FIG. 2 is an example of a pattern emitted by an illumination component $S_I$. As seen in FIG. 2, there is a bright spot (e.g., a large white spot) in the center of the pattern. This bright spot is often called the "zero-order" or "0th order" and is the result of direct propagation of the incident collimated beam upon the diffractive element(s) traveling through the optical elements that generate the pattern. In many cases, 1% to 5% (or more) of the optical energy emitted by the light emitter is concentrated in the zero-order spot, and the zero-order spot may be 100 to 500 times brighter than any other portion of the pattern. This high concentration of optical energy in one location is a limiting factor or bottleneck for generating practical patterns because, for example, an excessively strong collimated zero order may not pass consumer electronics laser safety requirements.

In general, it is difficult or impossible to fully eliminate the zero order in a manufacturing setting. This is because manufacturing tolerances, light source wavelength variation, and other factors in practice result in appearance of a zero order, even if the zero order is absent from the abstract design.

In addition, integrating a depth camera 102 including an illumination component 106 into a portable computing device such as a laptop computer, smartphone, and other mobile device, as shown for example in FIG. 3A, the thickness (or z-thickness or z-height) of the depth camera along its optical axis may be limited by the desired form factor of the computing device (e.g., a thickness less than 3.5 mm for the illuminator). In addition, these portable computing devices are currently under market pressure to be smaller and thinner. FIG. 3B is a schematic diagram of an image acquisition component $S_A$ and an active illumination component $S_I$, with x, y, and z axes labeled. As used herein, the z axis corresponds to the main optical axis of the element, e.g., the axis along the field of view of the image acquisition component $S_A$ and the axis along which the illumination component $S_I$ emits light.

Generally, an illumination component $S_I$ used in such systems has a co-linear optics package in which a light emitting component (e.g., a laser) is aligned on the same axis as various optical components such as a refractive lens and a separate diffractive optical element for generating the pattern. Such an illumination component generally has a thickness of at least 7 mm along the direction of the emission optical axis (or projection optical axis).

SUMMARY

Embodiments of the present invention relate to depth camera systems having reduced thickness and reduced zero-order effects and methods of operating the same.

According to one embodiment, a projection system configured to emit patterned light along a projection optical axis includes: a diffractive optical element configured to perform a collimation function and to perform a pattern generation function; and a light emitter configured to emit light toward the diffractive optical element, wherein the collimation function is configured to collimate the light emitted from the light emitter, and wherein the pattern generation function is configured to collimate the light emitted from the light emitter, the patterned light having substantially no collimated zero-order.

The projection system may further include a housing enclosing the light emitter and the diffractive optical element, the housing having an opening to expose the diffractive optical element.

The projection system may have no packaging layer between the light emitter and housing.

The projection system may have a thickness along the projection optical axis less than or equal to 3.5 mm.

The diffractive optical element may have a first facet and a second facet, wherein the first facet is configured to perform the collimation function, and wherein the second facet is configured to perform the pattern generation function. The diffractive optical element may have a single facet configured to perform both the collimation optical function and the pattern generation function.

A length of an optical path from the light emitter to the diffractive optical element is greater than or equal to 1 mm.

The light emitter may be configured to emit light along a direction non-coaxial to the projection optical axis wherein the projection system further includes a micro-mirror arranged to direct the light emitted by the light emitter in the direction of the projection optical axis.

The light emitter may be configured to emit light along a direction orthogonal to the projection optical axis.

According to one embodiment of the present invention, a depth camera system includes: a projection system configured to emit patterned light along a projection optical axis, the projection system including: a diffractive optical element configured to perform a collimation function and to perform a pattern generation function; and a light emitter configured to emit light toward the diffractive optical element, wherein the collimation function is configured to supply the pattern generation function with a collimated input, wherein the pattern generation function is configured to replicate the collimated beam to produce the patterned light, the patterned light having substantially no collimated zero-order; a first image sensor; a second image sensor; and a processor coupled to the first image sensor, the second image sensor, the projection system, and memory, the memory storing instructions that, when executed by the processor, cause the processor to: control the projection system to emit the pattern onto a scene; control the first image sensor and the second image sensor to capture a first image and a second image, the first image and the second image being captured substantially simultaneously; process the first image and the second image; and generate a depth map based on the first image and the second image.

The depth camera system may further include a housing enclosing the light emitter and the diffractive optical element, the housing having an opening to expose the diffractive optical element.

The depth camera system may include no packaging layer between the light emitter and housing.

The housing may have a thickness along the projection optical axis less than or equal to 3.5 mm.

A length of an optical path from the light emitter to the diffractive optical element may be greater than or equal to 1 mm.

The light emitter may be configured to emit light along a direction non-parallel to the projection optical axis, and wherein the projection system further includes a micro-mirror arranged to reflect the light emitted by the light emitter in the direction of the projection optical axis.

The light emitter may be configured to emit light along a direction orthogonal to the projection optical axis.

The diffractive optical element may have a first facet and a second facet, wherein the first facet is configured to perform the collimation function, and wherein the second facet is configured to perform the pattern generation function. The diffractive optical element may have an optically functional facet configured to perform both the collimation function and the pattern generation function.

According to one embodiment of the present invention, a method for projecting a pattern onto a scene along a projection optical axis includes: applying power to a light emitter to emit light along a first direction, the first direction being non-coaxial with the projection optical axis; directing the emitted light from the first direction toward the projection optical axis; collimating the emitted light; and replicating the collimated emitted light into the pattern, the pattern having substantially no collimated zero-order.

The collimating the emitted light and the replicating the collimated emitted light into the pattern may be performed by a single diffractive optical element.

The single diffractive optical element may have a first facet and a second facet, wherein the first facet is configured to collimate the emitted light, and wherein the second facet is configured to replicate the collimated light into the pattern. The diffractive optical element may have an optically functional facet configured to perform both the collimation optical function and the pattern generation function.

BRIEF DESCRIPTION OF THE DRAWINGS

The accompanying drawings, together with the specification, illustrate exemplary embodiments of the present invention, and, together with the description, serve to explain the principles of the present invention.

FIG. 3A is a schematic illustration of a computing device with an integrated depth camera.

FIG. 3B is a schematic diagram of an image acquisition component $S_A$ and an active illumination component $S_I$, with x, y, and z axes labeled.

DETAILED DESCRIPTION

Figure 1:
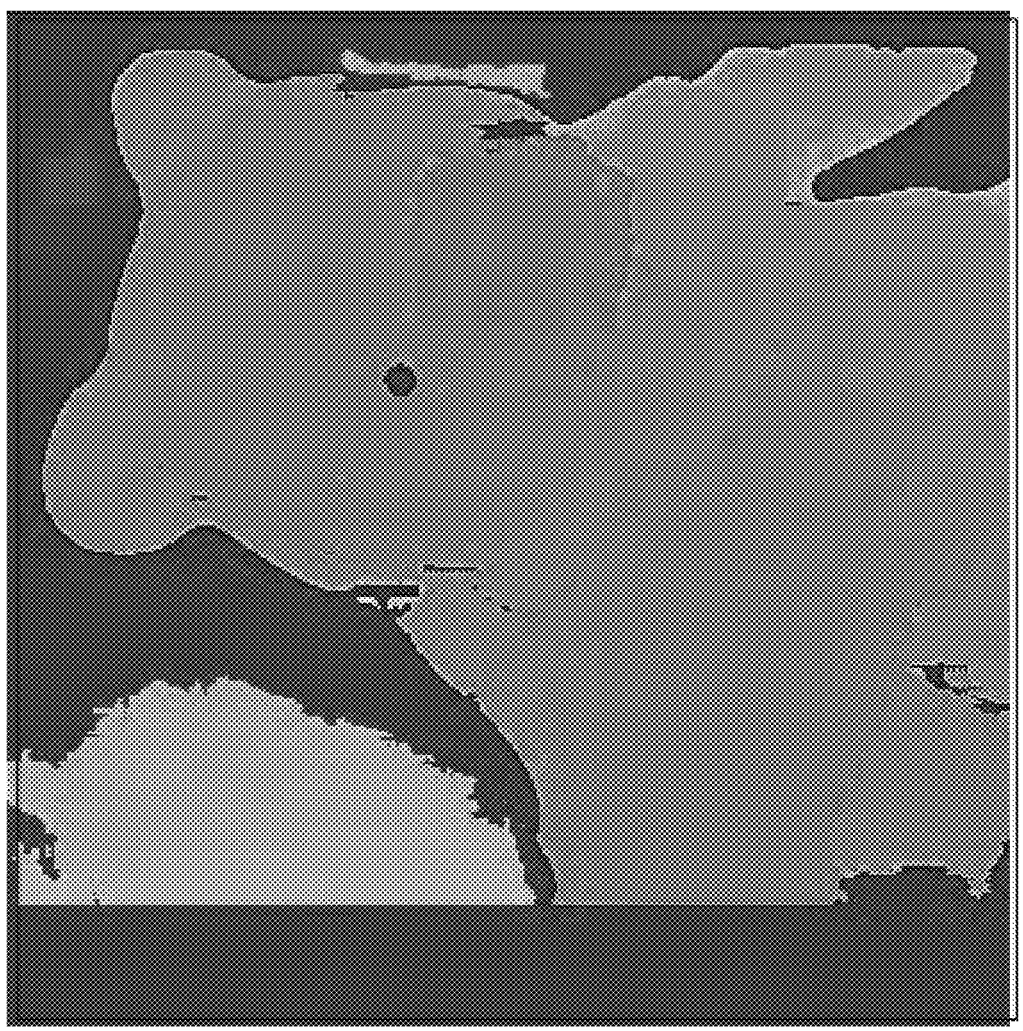
FIG. 1 is an example of a depth map generated by a depth camera.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention are directed to a systems and methods enabling an active depth camera system having a small thickness or small z-height. For example, the thickness of an active depth camera system according to some embodiments of the present invention is less than or equal to 3.5 mm.

In addition, aspects of embodiments of the present invention are directed to an illumination component $S_I$ capable of projecting patterned light in an illumination pattern in which a zero-order effect is reduced or negligible. In some embodiments, the zero-order effect is reduced by diffusing and spreading the zero-order spot over a larger area so that there is substantially no collimated zero-order in the patterned light emitted by the illumination component $S_I$.

Figure 4:
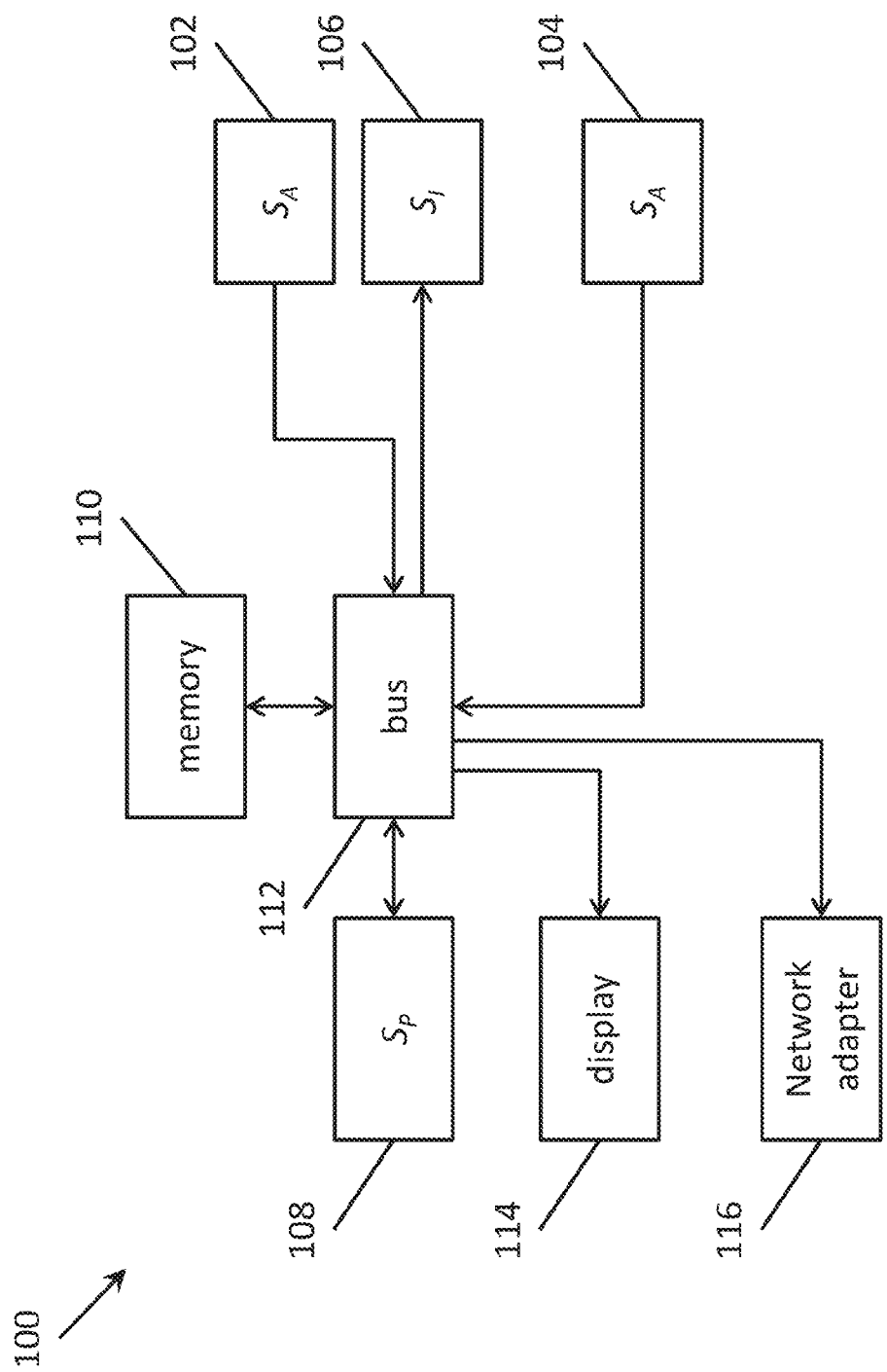
FIG. 4 is a block diagram illustrating a depth camera system according to one embodiment of the present invention.

FIG. 4 is a block diagram illustrating a depth camera system according to one embodiment of the present invention. As described above, generally, an active depth camera includes an active illumination component $S_I$ 106, an image acquisition component $S_A$ including a camera 102 (the embodiment in FIG. 4 shows a second camera 104 for stereo imaging, but embodiments of the present invention are not limited thereto), and a processing component $S_P$ 108, where the processing component implements a depth estimation algorithm.

The illumination component $S_I$ illuminates the scene with diffuse or collimated light which can be constant over time, pulsed, or modulated. The illumination may be concentrated in a single wavelength or span a range of wavelengths.

The image acquisition component $S_A$ acquires image information from the scene, which includes both ambient illumination and illumination from the active illumination component $S_I$. The captured image information may be stored in a plurality of frames, which may be acquired at regular intervals, such as at a frequency in the range of 5 Hz to 500 Hz. The image acquisition component $S_A$ may include a single image sensor or multiple image sensors. The image sensor or image sensors may be, for example, a semiconductor charge coupled device (CCD) image sensor or a complementary metal-oxide-semiconductor (CMOS) image sensor.

The processing component $S_P$ processes the captured image information and generates an estimated depth map of the scene $I_D$ using any of a variety of techniques for generating a depth map using active illumination, such as those described in more detail in R. Szeliski. "Computer Vision: Algorithms and Applications", Springer, 2010. In various embodiments of the present invention, the processing component $S_P$ may be any computing device capable of performing the processing of the captured images such as: a general purpose processor coupled to memory storing instructions to be executed by the processor; a field programmable gate array (FPGA) configured to perform the processing; an application specific integrated circuit (ASIC) designed to perform the processing (such as a graphics processing unit); or combinations thereof. In addition, in some embodiments, the computations may be spread across multiple processing components operating in parallel and/or in series.

Generally, an active illumination component $S_I$ includes a light emitter, a collimation optics lens, and a diffractive optical element (DOE). The light emitter may be a laser diode (e.g., in a TO-Can package). Because the light emitter may emit light having a large angular spread, the collimation optics lens is used to collect and collimate the emitted light. The diffractive optical element may then be used to replicate the collimated beam to form patterned light that is projected onto particular portions of the scene in an illumination pattern such as the pattern shown in FIG. 2.

Figure 5:
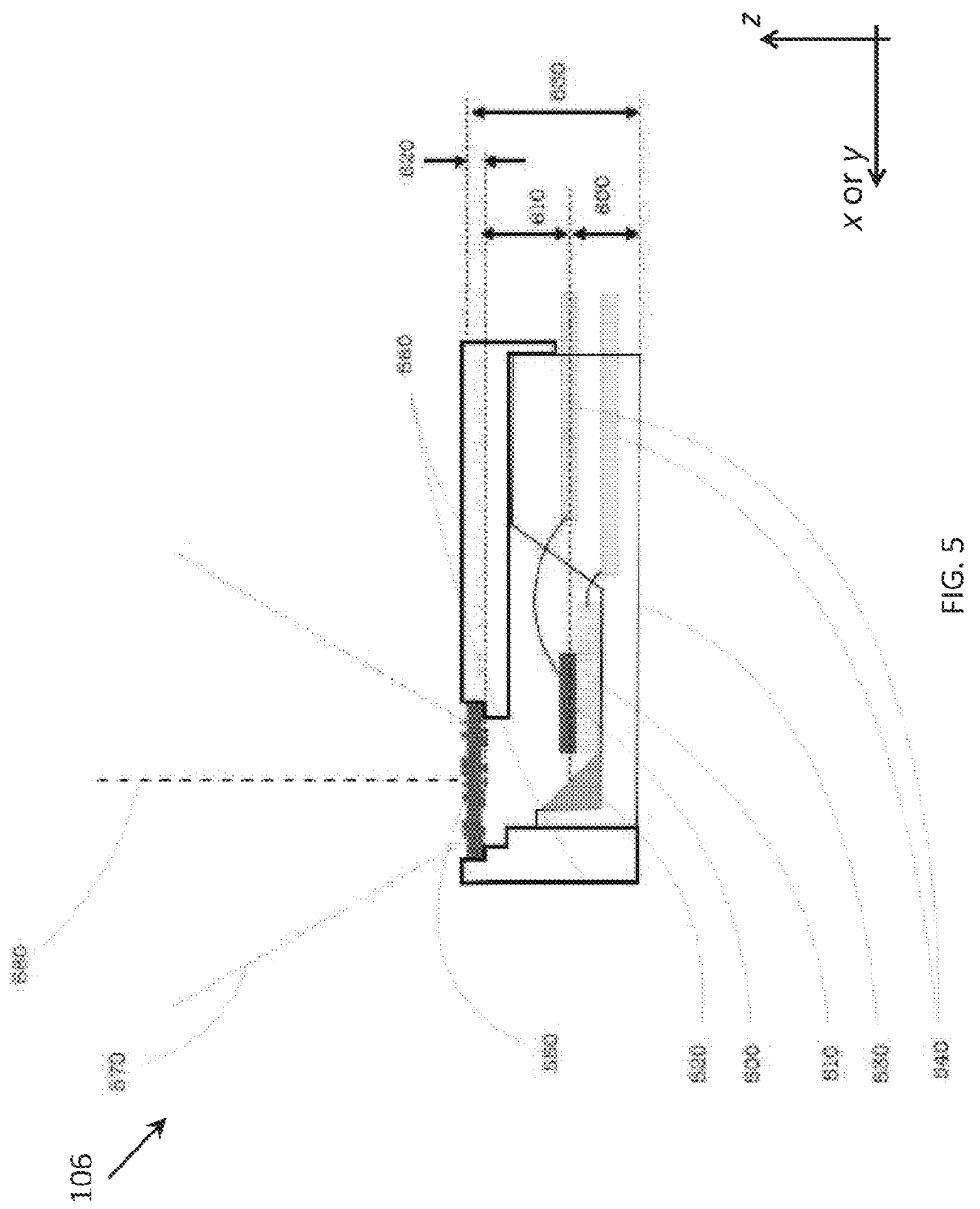
FIG. 5 is a cutaway side view of an active illumination component according to one embodiment of the present invention.

FIG. 5 is a side view of an active illumination component $S_I$ according to one embodiment of the present invention. Referring to FIG. 5, an active illumination component $S_I$ 106 includes a laser emitter having p- and n-type layers 500 and 510 connected (e.g., wire bonded) to leads 540, a micro-mirror (or mirror) 520, and a dual-function diffractive optical element (DOE) 550. The components are encapsulated by lower housing 530 and upper housing 560. The laser emitter is arranged to emit light in a direction orthogonal (e.g., perpendicular) to the optical axis (or emission optical axis or projection optical axis) 580 of the active illumination component 106 (depicted by the dotted line) and the micromirror 520 is arranged at an angle (e.g., a 45 degree angle) with respect to the orientation of the laser emitter and the optical axis 580 so that the light emitted by the laser emitter is reflected in the direction of the optical axis 580.

In some embodiments of the present invention, a different light emitting element such as a light-emitting diode (LED) is used in place of a laser diode.

In other embodiments of the present invention, the laser emitter is arranged to emit light along an axis that is non-coaxial to the optical axis 580. For example, the angle between the axis of the light emitter and the optical axis 580 may be greater than or less than 90 degrees and the micromirror 520 may be arranged at a suitable angle to direct the light emitted by the laser emitter toward the direction of the optical axis 580, thereby creating a folded optical path. As another example, the axis of the light emitter and the optical axis 580 may be parallel but non-coaxial and one or more mirrors may be used to direct the light emitted by the light emitter toward the optical axis 580.

The collimation optics lens is arranged at a distance from the laser emitter, where the distance is generally more than 1 mm. By splitting (or folding) the optical path between two axes (e.g., between the z axis and the x or y axis), the thickness of the active illumination component can be reduced.

The dual-function DOE 550 has a first side (or first facet) closer to (and facing) the micro-mirror 520 and a second side (or second facet) further away from and facing away from the micro-mirror 520. The first facet of the DOE 550 may have a shape that performs a first function (or first optical function) to collimate the reflected light beam (a collimation function or collimation optical function) and the second facet that performs a second function (or second optical function) to replicate the collimated beam in order to produce the patterned light in the illumination pattern (a pattern generation function or pattern generation optical function). In some embodiments, one facet of the dual-function DOE performs both the first function and the second function (e.g., the first function and the second function are performed by the same facet of the DOE and that same facet may be either the facet facing the micro-mirror 520 or may be the facet facing away from the micro-mirror 520). Whether the functions are performed by the different facets of the dual-function DOE or by the same facet of the DOE depends on manufacturing constraints. The integration of the collimation and pattern generation functions into a single diffractive optical element, regardless of whether the functions are split onto two facets or superposed onto one fact, results in a zero order that is diffuse, not collimated. A multi-function DOE according to one embodiment of the present invention is also described in U.S. Provisional Patent Application No. 62/133,252, titled "An Ultrathin 3D Depth Sensor and Projection System" filed in the U.S. Patent and Trademark Office on Mar. 13, 2015, the entire disclosure of which is incorporated herein by reference.

Figure 2:
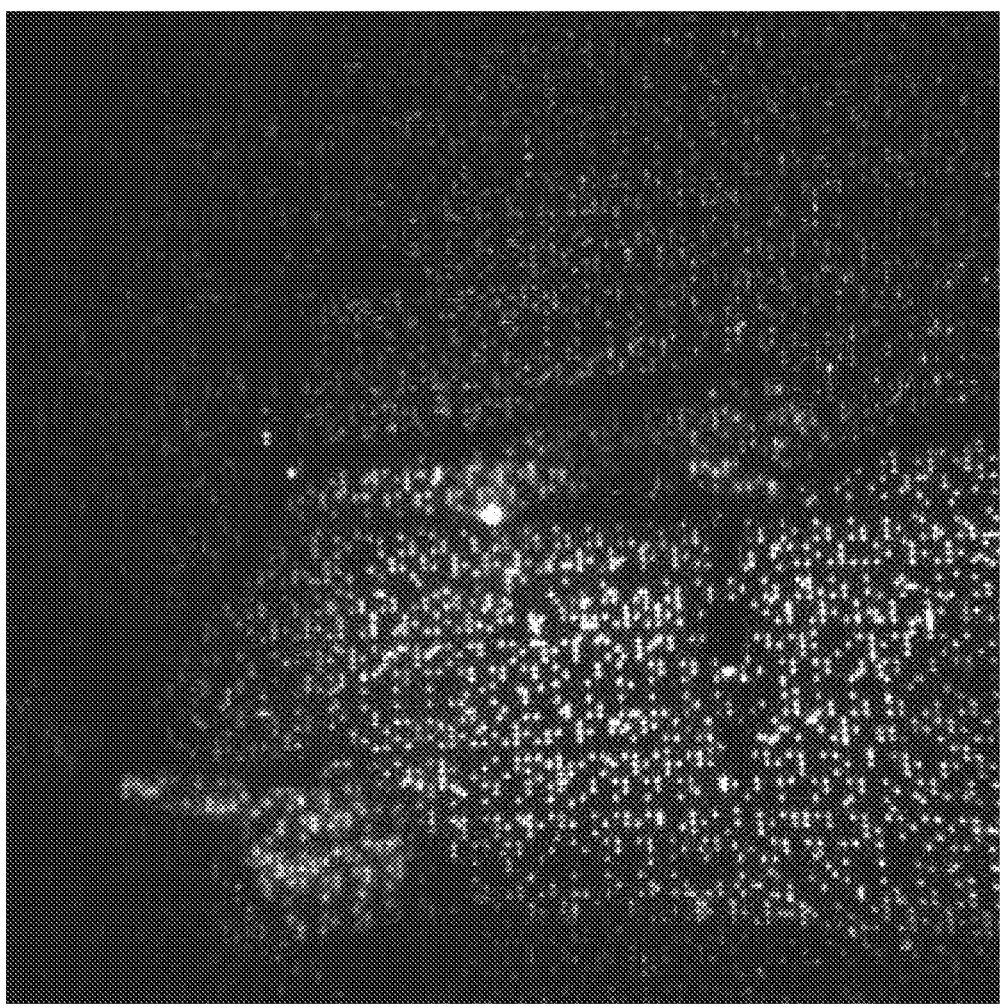
FIG. 2 is an example of a pattern emitted by an active illumination component.
Figure 6:
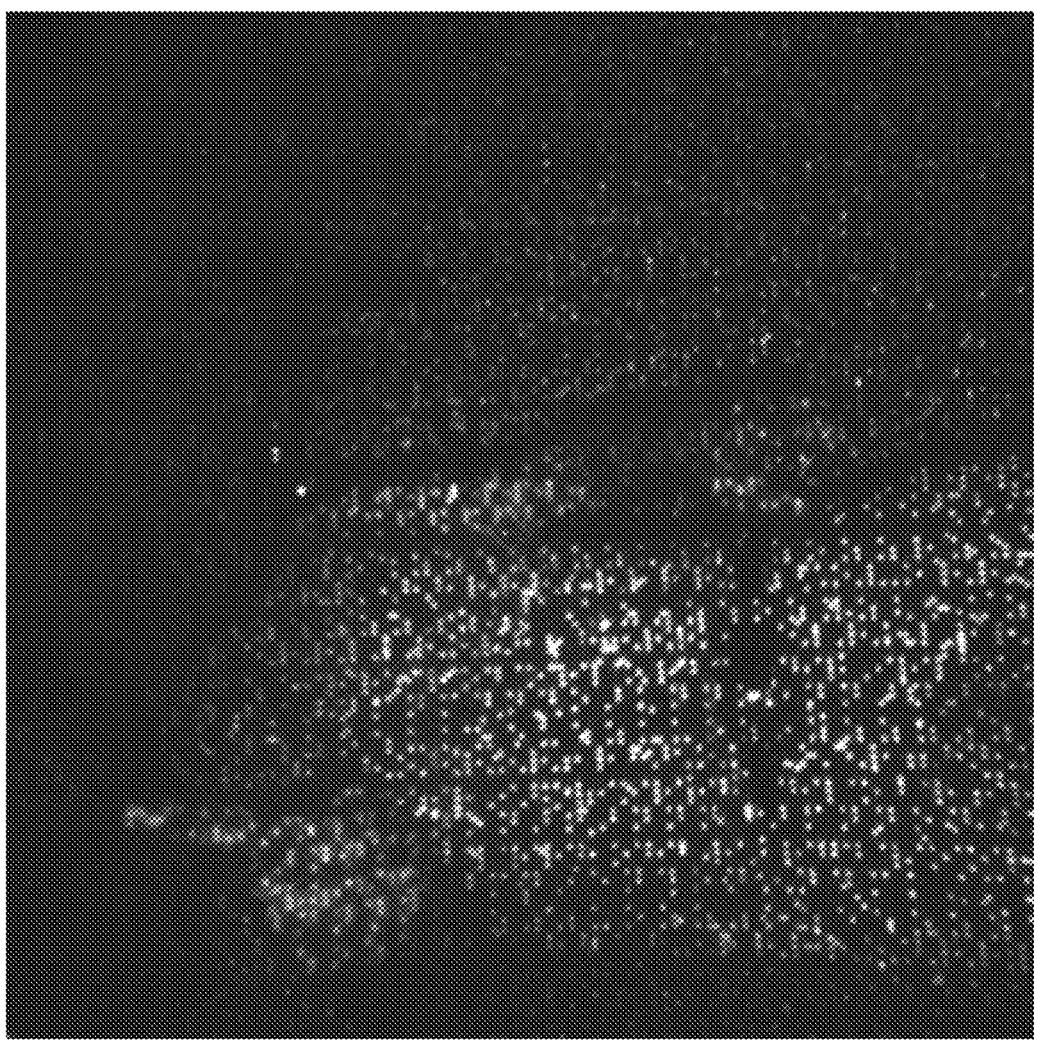
FIG. 6 is an example of a pattern where the zero-order has been substantially diffused and defocused by a diffractive optical element according to one embodiment of the present invention.

FIG. 6 is an example of patterned light (or an illumination pattern) where the zero-order has been substantially diffused and defocused by a dual-function DOE according to one embodiment of the present invention as compared to, for example, the illumination pattern shown in FIG. 2.

As shown in FIG. 5, the total thickness of the device 630 is the sum of: the thickness 600 of the package of the laser emitter; the distance 610 between the mirror and the dual-function DOE; and the thickness 620 of the dual-function DOE. In one embodiment, the thickness 600 is 0.78 mm, the distance 610 is 0.80 mm and the thickness 620 of the dual-function DOE 550 is in the range 0.75 mm-1.00 mm and therefore a total thickness 630 is in the range 2.33 mm-2.83 mm.

In embodiments of the present invention, the overall thickness of the device is reduced because only a single DOE 550 is used, rather than multiple DOEs that split the emitted light by cascading the beam through multiple stages. In addition, in embodiments of the present invention, the thickness of the device (e.g., along the optical axis) is reduced because a separate refractive lens is not needed for collimating the light. Furthermore, embodiments of the present invention are more resilient towards manufacturing errors and tolerances when compared to cascade or tiling methods, which are extremely sensitive to misalignment between the diffractive optical elements.

In some embodiments of the present invention, the laser emitter is included within the housing 530 and 560 without additional packaging material between the laser emitter and the DOE 550. For example, the laser emitter 500 may be included as a laser diode with appropriate contacts and without a protective TO-Can package located between the laser diode and the housing 530 and 560. This allows the package to be sealed (e.g., hermetically sealed) for environmental resilience of the laser emitter 500.

Some embodiments of the invention are also directed to an image acquisition component $S_A$ that is robust with respect to misalignment of the active illumination component $S_I$, such as a multi-camera (or stereo) image acquisition system $S_A$. For example, the image acquisition system $S_A$ shown in FIG. 3A and FIG. 4 includes first and second cameras 102 and 104. Such a multi-camera system may be used with stereo depth reconstruction algorithms (such as those described in R. Szeliski. "Computer Vision: Algorithms and Applications," Springer, 2010.) in which patterned light applied to the scene by the active illumination component $S_I$ is used to introduce texture onto the scene and knowledge about the pattern itself is not directly used to perform the depth estimation.

Figure 7:
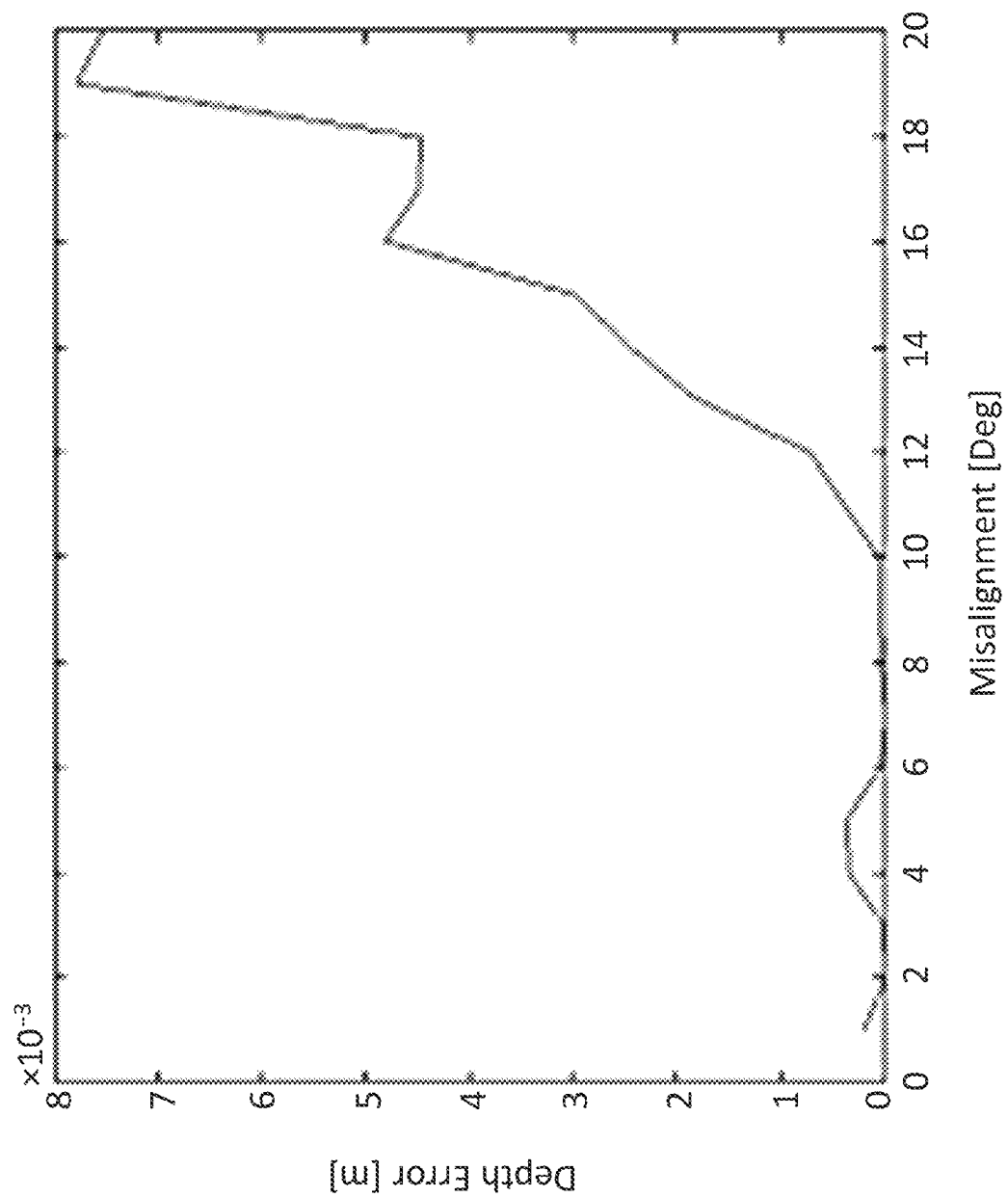
FIG. 7 is a graph illustrating the depth reconstruction error by a stereo camera depth reconstruction system according to one embodiment of the present invention as a function of misalignment of the optical axis of the active illumination component $S_I$.

FIG. 7 is a graph illustrating the depth error (in meters) by a stereo camera depth reconstruction system as a function of misalignment, in units of degrees, of the optical axis of the active illumination component $S_I$. As seen in FIG. 7, the error rate is relatively low, at less than about 1 millimeter, when the misalignment less than about 12 degrees.

In contrast, an active depth camera system having a single camera is very sensitive to misalignments between the illumination source $S_I$ and assumes precise calibration of the components and a rigid alignment between the image acquisition system $S_A$ and the illumination source $S_I$. In a single camera depth sensor comparable in general performance to the stereo camera system mentioned above, the single camera system is intolerant of misalignments greater than 1 degree.

The arrangement of components and the use of a folded optical path as in embodiments of the present invention may result in tolerances that are larger (or looser) than those observed in comparative active illumination components having an on-axis optical path (e.g., an optical path without mirrors). In addition, heating of components such as the mirror (e.g., heating from the laser diode) may cause changes in the optical characteristics of the device. For example, the tolerance of the direction of propagation of the light beam after reflection by the micro-mirror 520 may be in the range of 1 to 5 degrees due to variability in the angle of light emitted by the laser emitter 500 and variability in the angle of the micro mirror 520.

Therefore, an active illumination system having a folded optical path such as in embodiments of the present invention would generally not be usable with depth camera systems that require a high degree of alignment between the illumination system $S_I$ and the image acquisition system $S_A$.

On the other hand, a multi-camera depth reconstruction system as described above with respect to FIG. 7 is robust throughout the misalignment 1 to 5 degrees expected be exhibited by an active illumination system $S_I$ according to embodiments of the present invention. Therefore, aspects of embodiments of the present invention are directed to making an active illumination system $S_I$ having a folded optical path practical for use in a depth camera system.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A projection system configured to emit patterned light along a projection optical axis, the projection system comprising:
    a diffractive optical element configured to perform a collimation function and to perform a pattern generation function; and
    a light emitter comprising a semiconductor laser diode configured to emit uncollimated light toward the diffractive optical element,
    wherein the collimation function is configured to collimate the light emitted from the light emitter, and
    wherein the pattern generation function is configured to replicate the collimated light to produce the patterned light, the patterned light having substantially no collimated zero-order.

2. The projection system of claim 1, further comprising a housing enclosing the light emitter and the diffractive optical element, the housing having an opening to expose the diffractive optical element.

3. The projection system of claim 2, wherein there is no packaging material between the light emitter and housing.

4. The projection system of claim 2, wherein the projection system has a thickness along the projection optical axis less than or equal to 3.5 mm.

5. The projection system of claim 1, wherein the diffractive optical element has a first facet and a second facet,
    wherein the first facet is configured to perform the collimation function, and
    wherein the second facet is configured to perform the pattern generation function.

6. The projection system of claim 1, wherein the diffractive optical element has an optically functional facet configured to perform both the collimation function and the pattern generation function.

7. The projection system of claim 1, wherein a length of an optical path from the light emitter to the diffractive optical element is greater than or equal to 1 mm.

8. The projection system of claim 1, wherein the light emitter is configured to emit light along a direction non-coaxial to the projection optical axis, and
    wherein the projection system further comprises a micro-mirror arranged to direct the light emitted by the light emitter in the direction of the projection optical axis.

9. The projection system of claim 8, wherein the light emitter is configured to emit light along a direction orthogonal to the projection optical axis.

10. A depth camera system comprising:
    a projection system configured to emit patterned light along a projection optical axis, the projection system comprising:

a diffractive optical element configured to perform a collimation function and to perform a pattern generation function; and a light emitter configured to emit light toward the diffractive optical element, wherein the collimation function is configured to supply the pattern generation function with a collimated beam, and wherein the pattern generation function is configured to replicate the collimated beam to produce the patterned light, the patterned light having substantially no collimated zero-order;

a first image sensor;

a second image sensor; and a processor coupled to the first image sensor, the second image sensor, the projection system, and memory, the memory storing instructions that, when executed by the processor, cause the processor to:

control the projection system to emit the pattern onto a scene;

control the first image sensor and the second image sensor to capture a first image and a second image, the first image and the second image being captured substantially simultaneously;

process the first image and the second image; and generate a depth map based on the first image and the second image.

11. The depth camera system of claim 10, further comprising a housing enclosing the light emitter and the diffractive optical element, the housing having an opening to expose the diffractive optical element.

12. The depth camera system of claim 11, wherein there is no packaging material between the light emitter and housing.

13. The depth camera system of claim 11, wherein the housing has a thickness along the projection optical axis less than or equal to 3.5 mm.

14. The depth camera system of claim 10, wherein a length of an optical path from the light emitter to the diffractive optical element is greater than or equal to 1 mm.

15. The depth camera system of claim 10, wherein the light emitter is configured to emit light along a direction non-parallel to the projection optical axis, and wherein the projection system further comprises a micromirror arranged to reflect the light emitted by the light emitter in the direction of the projection optical axis.

16. The depth camera system of claim 15, wherein the light emitter is configured to emit light along a direction orthogonal to the projection optical axis.

17. The depth camera system of claim 10, wherein the diffractive optical element has a first facet and a second facet, wherein the first facet is configured to perform the collimation function, and wherein the second facet is configured to perform the pattern generation function.

18. The depth camera system of claim 10, wherein the diffractive optical element has an optically functional facet configured to perform both the collimation function and the pattern generation function.

19. A method for projecting a pattern onto a scene along a projection optical axis, the method comprising:

applying power to a light emitter comprising a semiconductor laser diode to emit uncollimated light along a first direction, the first direction being non-coaxial with the projection optical axis;

directing the emitted light from the first direction toward the projection optical axis;

collimating the emitted light; and replicating the collimated emitted light into the pattern, the pattern having substantially no collimated zero-order.

20. The method of claim 19, wherein the collimating the emitted light and the replicating the collimated emitted light into the pattern are performed by a single diffractive optical element.

21. The method of claim 20, wherein the single diffractive optical element has a first facet and a second facet, wherein the first facet is configured to collimate the emitted light, and wherein the second facet is configured to replicate the collimated light into the pattern.

22. The method of claim 20, wherein the single diffractive optical element has one optically functional facet configured to both collimate the emitted light and replicate the collimated light into the pattern.

* * * * *